Patented Jan. 13, 1925.

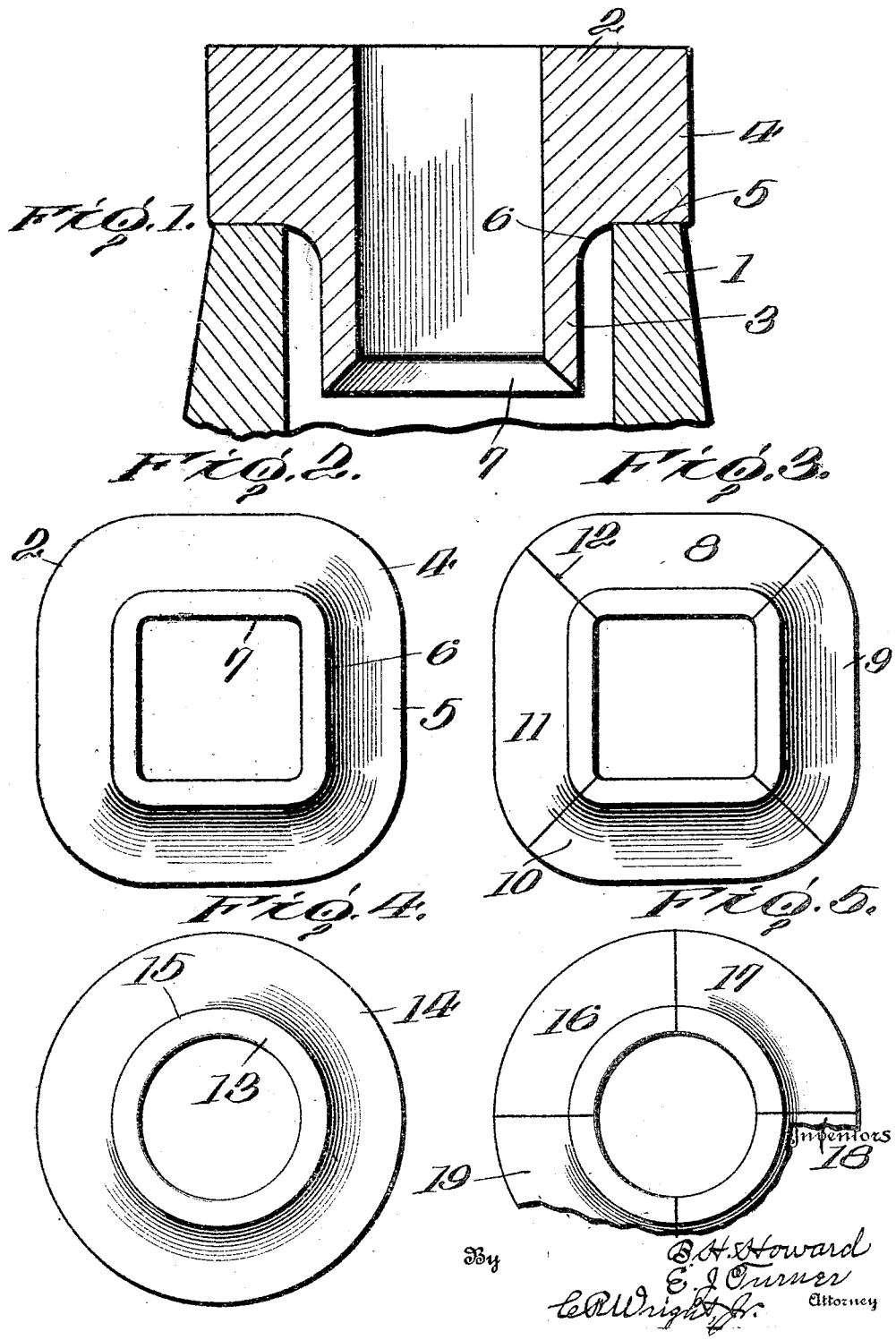

1,523,212

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 1, 1924. Serial No. 753,159.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder adapted to be readily inserted in the upper end of the mold and held therein, and at the same time provide a feeder that will prevent the formation of what is known as "piping" and also reduce segregation.

Another object of our invention is to provide a feeder for ingot molds having the thickened upper portion whereby sufficient material is used to retain the heat to prevent the rapid cooling of the upper end of the ingot, and said thickened portion also serving as supporting means for supporting the feeder on the upper end of the mold with the lower end extending therein, and having means whereby the feeder will center itself and be wedged within the mold in the event that the mold is of a greater diameter than the exterior diameter of the lower portion of the feeder.

A further object of our invention is to provide a simple, cheap and effective feeder made of refractory material, and having certain details of structure and combination of parts hereinafter more fully set forth.

In the accompanying drawings:

Figure 1 is a vertical sectional view of an ingot mold showing our improved feeder applied thereto.

Figure 2 is a bottom plan view of the feeder.

Figure 3 is a bottom plan view of a feeder made in sections.

Figure 4 is a bottom plan view of a circular solid feeder embodying our invention.

Figure 5 is a bottom plan view partly broken away showing a circular sectional feeder.

Referring now to the drawings, 1 represents the mold and 2 the feeder. The feeder 2 as shown, consists of a body portion 3 adapted to enter the bore of the mold, and is provided at its upper end with the thickened portion 4 forming a supporting means for the feeder. This thickened portion, as will be readily understood, is adapted to retain the heat and prevent the rapid cooling of the upper end of the mold, and the ingot therein. This thickened portion 4 forms an annular flange, the lower end of which is provided with a horizontal face 5 terminating in the curved wall 6 which in turn terminates in the plane wall of the body portion 3. The lower end of the body portion is beveled as indicated at 7.

In the modification shown in Figure 3, we have shown the feeder made in four sections 8, 9, 10 and 11 having their ends cut at an angle as indicated at 12, and when the separate sections are placed in the mold the sections are independently supported by the thickened portion 4, so that they can be readily assembled in the proper relation in the mold.

In Figure 4 we have shown the feeder 13 of a circular form, and the body portion thereof connected to the thickened portion 4 by the curved portion 15.

In the modification shown in Figure 5, we have shown the circular feeder made in four sections 16, 17, 18 and 19.

From the foregoing description it will be seen that the feeder, owing to the concave portion 6, will center itself upon the mold where the mold is of a less diameter than that shown in Figure 1 of the drawings, or when placed in the mold of the diameter shown in Figure 1 the curved walls will cause the feeder to assume the position shown in Figure 1 with the horizontal wall 5 of the thickened portion 4 resting upon the upper end of the mold.

Having thus fully described our invention what we claim is:—

1. A feeder for ingot molds comprising a body portion having a thickened upper end, having its lower face horizontal and connected to the body portion by a concave wall.

2. A feeder for ignot molds comprising a body portion having a thickened portion having its lower end connected to the body portion by a curved wall, 3. A feeder for ingot molds comprising a tubular body portion having an enlarged upper end forming an annular flange, the lower face of which is horizontal and connected to the body portion by a curved wall.

4. A feeder for ingot molds comprising a tubular body portion having a thickened upper end forming an annular flange formed with a flat, broad horizontal face and terminating in a concave face connecting the body portion.

5. A feeder for ingot molds comprising a rectangular body portion having a thickened portion connected by a curved wall to the thinner portion.

In testimony whereof we affix our signatures.

BLOOMFIELD H. HOWARD.
ERNEST J. TURNER.